United States Patent
Ma et al.

(10) Patent No.: US 10,901,954 B2
(45) Date of Patent: Jan. 26, 2021

(54) HOST-LEVEL PERSISTENT VOLUME MANAGEMENT FOR CONTAINER CLOUDS

(71) Applicant: INTERNATIONAL BUSINESS MACHINES CORPORATION, Armonk, NY (US)

(72) Inventors: Jian Ma, Beijing (CN); Guang Cheng Li, Beijing (CN); Jing Min Xu, Beijing (CN); Xiao Xi Liu, Beijing (CN); Yuan Wang, Nanjing (CN); Lin Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 16/180,630

(22) Filed: Nov. 5, 2018

(65) Prior Publication Data
US 2020/0142975 A1    May 7, 2020

(51) Int. Cl.
*G06F 17/00* (2019.01)
*G06F 16/178* (2019.01)
*G06F 16/182* (2019.01)

(52) U.S. Cl.
CPC ........ *G06F 16/178* (2019.01); *G06F 16/1844* (2019.01)

(58) Field of Classification Search
CPC ... G06F 16/178; G06F 16/1844; G06F 16/182
See application file for complete search history.

(56) References Cited

U.S. PATENT DOCUMENTS

| | | | |
|---|---|---|---|
| 5,603,019 A * | 2/1997 | Kish | G06F 16/10 707/757 |
| 8,694,549 B2 | 4/2014 | Bumgarner et al. | |
| 9,613,064 B1 * | 4/2017 | Chou | G06F 16/182 |
| 9,891,952 B1 | 2/2018 | Chen | |
| 2014/0149475 A1 | 5/2014 | Darcy et al. | |
| 2015/0120928 A1 * | 4/2015 | Gummaraju | H04L 67/1008 709/226 |
| 2016/0224580 A1 * | 8/2016 | Jain | G06F 16/134 |
| 2016/0359955 A1 | 12/2016 | Gill et al. | |
| 2017/0061146 A1 * | 3/2017 | Lu | G06F 21/604 |
| 2017/0091075 A1 * | 3/2017 | Bhat | G06F 11/3688 |
| 2017/0337109 A1 * | 11/2017 | Ramu | G06F 11/1448 |
| 2020/0142975 A1 * | 5/2020 | Ma | G06F 16/1844 |

OTHER PUBLICATIONS

Oracle. System Administration Guide: Network Services. <https://web.archive.org/web/20150928071530/https://docs.oracle.com/cd/E23823_01/pdf/816-4555.pdf> (Year: 2015).*

(Continued)

*Primary Examiner* — Syed H Hasan
(74) *Attorney, Agent, or Firm* — Tutunjian & Bitetto, P.C.; Joseph Petrokaitis (57) ABSTRACT

Methods and systems for managing persistent volumes include receiving a request from a container on a processing node to access a local mount point. A distributed filesystem located outside the processing node is mounted to a local mount point. Access to the local mount point is provided to the container.

20 Claims, 6 Drawing Sheets

(56) References Cited

OTHER PUBLICATIONS

O'Reilly. Disk Quotas. <https://web.archive.org/web/20150113234405/https://docstore.mik.ua/orelly/unix3/upt/ch15_11.htm> (Year: 2015).*
Janakiram MSV, Managing Persistence for Docker Containers, The New Stack, Sep. 23, 2016.
Benjamin Wootton, Persistent Storage Strategies for Containers, https://www.contino.io/insights/persistent-storage-strategies-for-containers, Jun. 19, 2018.
Mohamed Mohamed et al., Ubiquity: An Extensible Framework for Persistence in Container Environments, International Conference on Service-Oriented Computing, Jun. 16, 2018.

* cited by examiner

HOST-LEVEL PERSISTENT VOLUME MANAGEMENT FOR CONTAINER CLOUDS

BACKGROUND

Technical Field

The present invention generally relates to cloud computing systems and, more particularly, to the implementation of persistent, vendor-neutral, host-level storage in container clouds.

Description of the Related Art

Platform as a Service (PaaS) systems provide rapidly provisioned computing solutions for diverse workloads on an as-needed basis. Such PaaS systems may have a set of different processing nodes, each of which can be provisioned with a different set of images or "containers" that provide the software needed for workload execution. The PaaS systems may also include a registry system that stores, distributes, and manages those images, sending the images to processing nodes when requested.

A container orchestration engine is responsible for providing the registry, provisioning and orchestrating containers and managing their lifecycles. The container orchestration engine provides persistent volumes that provide persistent storage that is accessible to containers, storing container data, configuration, work product, etc. The persistent volumes have a lifecycle that is independent of the containers, so that data persists even if the container that stored the data is decommissioned.

SUMMARY

A method for managing persistent volumes includes receiving a request from a container on a processing node to access a local mount point. A distributed filesystem located outside the processing node is mounted to a local mount point. Access to the local mount point is provided to the container.

S system for managing persistent volumes includes a container orchestration engine, executed in a hardware processing node, configured to receive a request from a container on a processing node to access a local mount point. A storage provision engine is configured to mount a distributed filesystem located outside the processing node to a local mount point and to give access to the local mount point to the container.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention provide persistent volumes for container cloud systems. The present embodiments provide a storage provision engine that is positioned logically between the distributed filesystem and a hostpath driver of the cloud computing system, managing the distributed filesystem's local mounts and the mount points' lifecycle. A quota manager monitors and manages the individual persistent volume directory's quota and isolation while a sync engine syncs persistent volume and quota information. The storage provision engine interacts with the quota manager and exposes the persistent volume to the hostpath driver of a container orchestration engine, making the filesystem accessible to containers without needing a native driver in the container orchestration engine.

In this manner, a persistent volume can be implemented without interfering with the built-in code of the container orchestration engine. As a result, bug fixes, security patches, and new features can be implemented to the persistent volume without waiting for the container orchestration engine's next release. Furthermore, the persistent volume does not rely on a specific vendor, but can instead be implemented by the end user, while expanding on the functionality generally provided by the container orchestration engine to out-of-tree drivers. For example, the use of the storage provision engine expands the ability to share data between hosts as compared to other out-of-tree driver implementations.

It is to be understood in advance that, although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Figure 1:
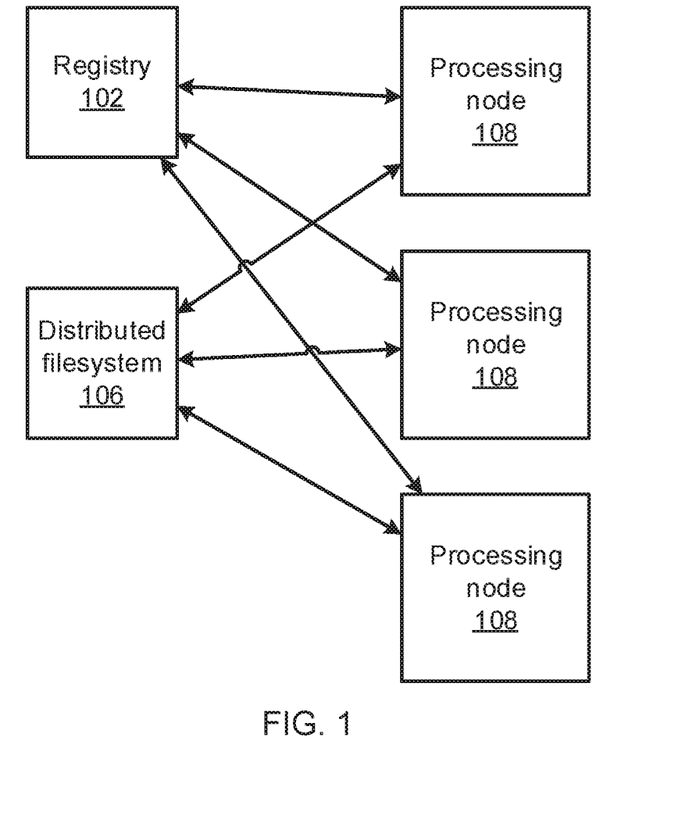
FIG. 1 is a block diagram of a distributed Platform as a Service system with multiple containers sharing access to a distributed filesystem in accordance with an embodiment of the present invention.

Referring now to FIG. 1, a cloud computing system 100 is shown. A container orchestration engine 102 interacts with a number of processing nodes 108, each of which represents a separate logical or physical processing system. The registry 102 provisions the processing nodes 108 with containers that include operating environments configured for the execution of particular workloads. The containers include, for example, applications, configuration information, and drivers that provide the ability for the processing node 108 to execute the workload.

In particular, the containers include access information for one or more persistent volumes 106. To communicate with the distributed filesystem 106, a container orchestration engine at each processing nodes 108 communicates with a respective storage provision engine which, in turn, provides an interface to the distributed filesystem 106. To accomplish this, the containers that are executed at the processing nodes 108 instruct the container orchestration engine to communicate with the storage provision engine outside of its built-in storage drivers, for example using a "hostpath" functionality that provides the container to execute local processing function and the processing nodes 108.

The hostpath function provides the container orchestration engine with the ability to mount a local directory, file, or UNIX socket. The hostpath function is thereby used to invoke the storage provision engine, which provisions and mounts the distributed filesystem 106 as a directory. The storage provision engine communicates directory information back to the hostpath function, which then provides access to the distributed filesystem 106 to the container orchestration engine. The storage provision engine works with a quota manager to mount one or more local persistent volume directories that are mounted from the distributed filesystem 106. In this manner, the distributed filesystem 106 is treated as a local filesystem by the processing node 108, with all of the complexity of sharing data between different containers and different processing nodes 108 being handled by the storage provision engine and a sync engine.

Figure 2:
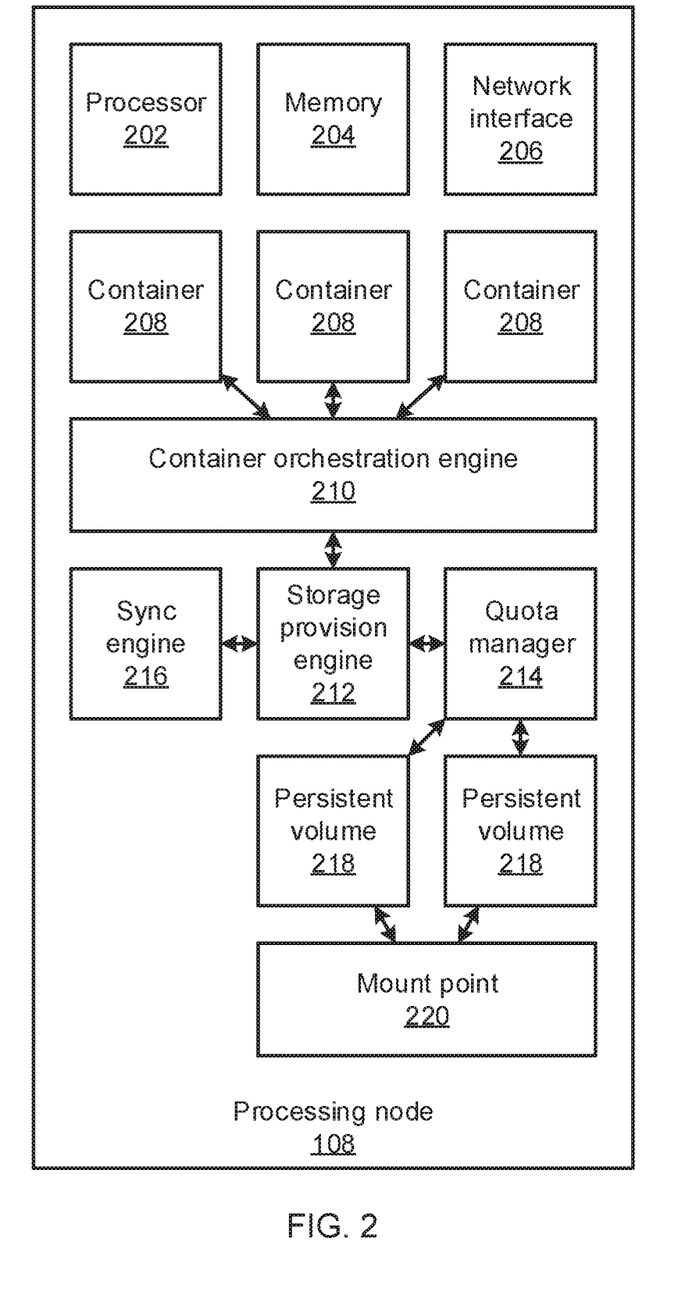
FIG. 2 is a block diagram of an individual processing node in a distributed Platform as a Service system that uses a storage provision engine to manage access to persistent volumes in accordance with an embodiment of the present invention.

Referring now to FIG. 2, additional detail on a processing node 108 is shown. The processing node 108 includes a hardware processor 202, a memory 204, and a network interface 206. The network interface 206 is configured to communicate with the registry 102, with the distributed filesystem 106, and with other processing nodes 108 as needed, using any appropriate communications medium and protocol. The processing node 108 also includes one or more functional modules that may, in some embodiments, be implemented as software that is stored in the memory 204 and that is executed by the hardware processor 202. In other embodiments, one or more of the functional modules may be implemented as one or more discrete hardware components in the form of, e.g., application-specific integrated chips or field programmable gate arrays.

The processing node 108 includes one or more containers 208. It is specifically contemplated that each container 208 represents a distinct operating environment. The containers 208 each include a set of software applications, configuration files, workload datasets, and any other information or software needed to execute a specific workload. The containers 208 are stored in memory 204 and are instantiated and decommissioned by the container orchestration engine as needed. It should be understood that, as a general matter, an operating system of the processing node 108 exists outside the containers 208. Thus, each container 208 interfaces with the same operating system kernel, reducing the overhead needed to execute multiple containers simultaneously. The containers 208 meanwhile generally have no communication with one another outside of specifically agreed-to interfaces, reducing security concerns.

When a container 208 accesses the distributed filesystem 106, it communicates with the container orchestration engine 210 and uses, for example, a "hostpath" function to call for the mounting of a persistent volume 218. It should be understood that the "hostpath" function is specific to certain container orchestration engine software, but that any appropriate function can be used if it provides for the mounting of a local filesystem for the container 208 without invoking a built-in persistent volume driver within the container orchestration engine 210.

Upon receipt of a request from a container 208, the container orchestration engine 210 communicates with the storage provision engine 212. When the storage provision engine 212 receives a directory request from the hostpath driver of the container orchestration engine 210, it provisions the distributed filesystem 106 with a local directory mount point, informs the quota manager 214 and sync engine 216 to complete quota/isolation and information syncing processes, and provides a directory back to the hostpath driver. The storage provision engine 212 thereby uses the interface of the distributed filesystem 106 to create a mount point and mount the filesystem to that mount point, thereby creating a persistent volume 218.

The quota manager 214 interacts with the storage provision engine 202 to set quotas and isolation for the persistent volume directories 218. The quota manager 214 gets information from the storage provision engine 212 regarding the successful mount of the distributed filesystem 106 and can be implemented as, for example, a kernel module, where system calls monitor the directory size and isolation of the persistent volumes 218. The quota manager 214 interacts with the storage provision engine 212 to address volumes overrunning their quotas. For example, the quota manager 214 can perform actions based on policy, such as halting writing operations, when the directory's size exceeds a predetermined quota. The quota amount for an individual directory is determined when the persistent volume 218 is created. Isolation is used to ensure that the persistent volume 218 cannot be used by other processes.

A sync engine 216 communicates with sync engines 216 from other processing nodes 108. The sync engine 216 communicates information relating to how the persistent volumes 218 are being used, including quota information and isolation information. Quota and isolation is set on a per-host basis, so the sync engine 216 communicates that information to other hosts to guarantee consistence across different nodes.

The persistent volumes 218 are represented herein as directories in the local filesystem of the processing node 108. These directories can then be mount points 220 for the distributed filesystem 106. As the containers 208 access the persistent volumes 218, filesystem operations are transmitted to and from the distributed filesystem 106, making the data in the distributed filesystem 106 accessible to the containers. In particular, it should be noted that multiple containers 208 can share access to the distributed filesystem 106 in this manner.

Figure 3:
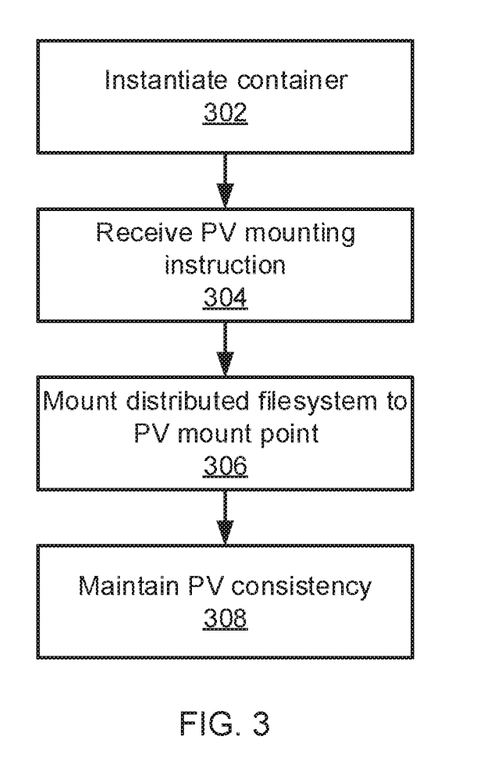
FIG. 3 is a block/flow diagram of a method of managing access to persistent volumes in accordance with an embodiment of the present invention.

Referring now to FIG. 3, a method for operating a persistent volume 218 is shown. Block 302 instantiates a container 208 in a processing node 108. This process can include fetching the container image from registry 102 and performing whatever configurations are needed locally to run the container 208. The container orchestration engine 210 provides an interface to the containers 208, executing and decommissioning them as needed and receives instructions from the containers 208 regarding any external functions.

At block 304, the container orchestration engine 210 receives an instruction from a container 208 to mount a persistent volume 218. In particular, this instruction may be executed as a "hostpath" driver instruction that provides instructions for the mounting of a local directory, outside of the in-built persistent volume driver functionality of the container orchestration engine 210. The container orchestration engine 210 provides access to the persistent volume directory to the container 208, but the storage provision engine 212 also receives the instruction and mounts the distributed filesystem 106 to the persistent volume directory. This provides access to the distributed filesystem 106 to the container 208. Block 308 then maintains the consistency and quota limitations of the mounted persistent volume 218 by way of the sync engine 216 and the quota manager 214, allowing multiple containers 208 across multiple processing nodes 108 to access the same distributed filesystem 106.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
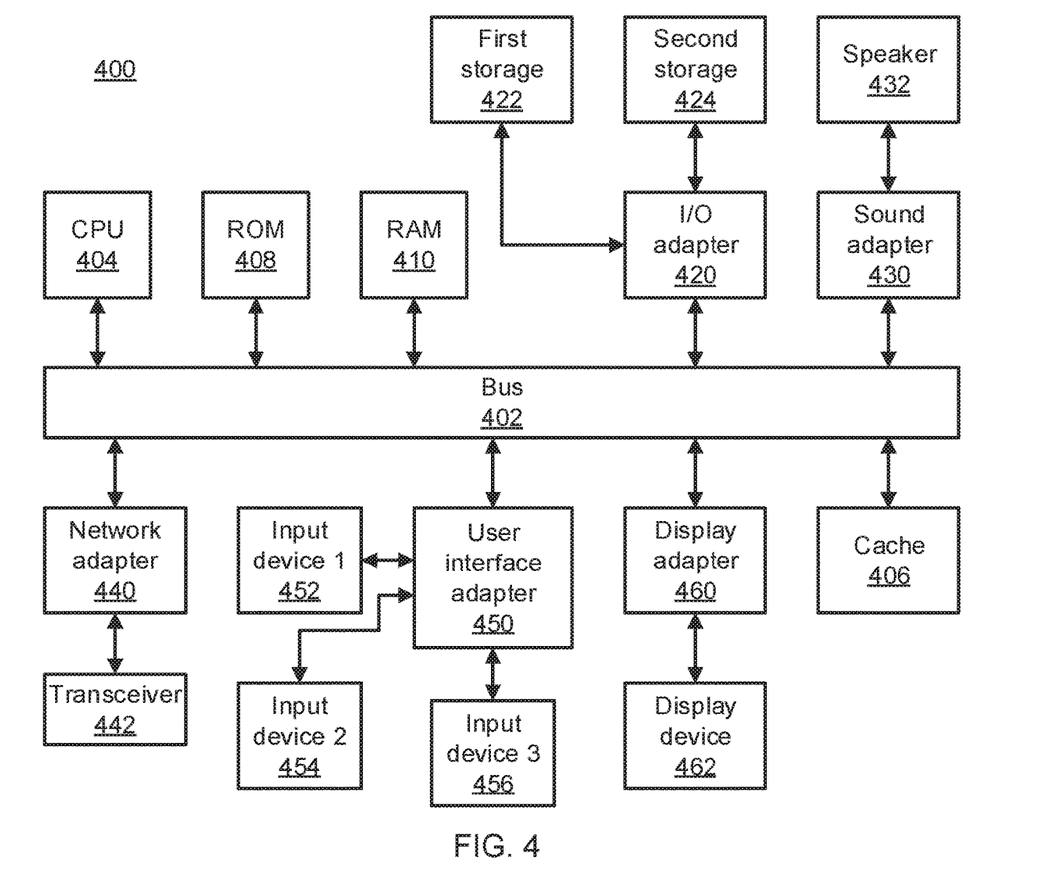
FIG. 4 is a block diagram of a processing system in accordance with an embodiment of the present invention.

Referring now to FIG. 4, an exemplary processing system 400 is shown which may represent the transmitting device 100 or the receiving device 120. The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Figure 5:
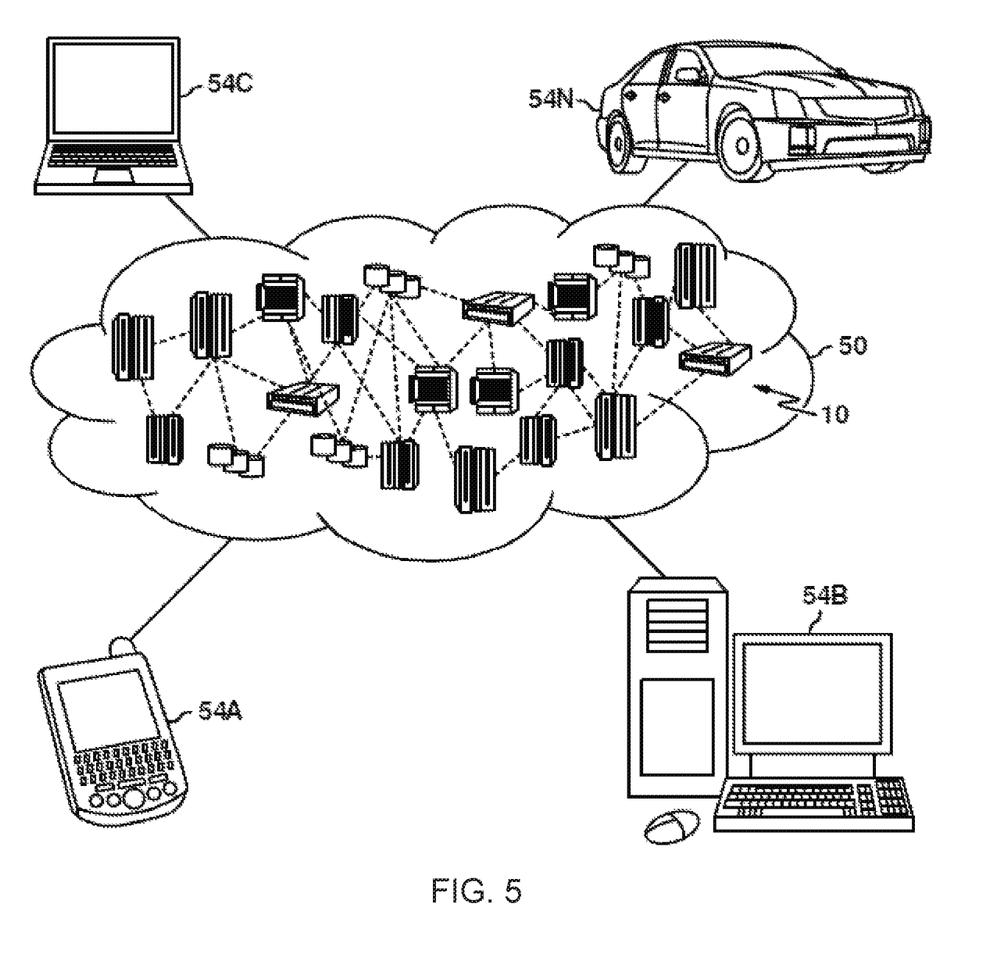
FIG. 5 is a diagram of a cloud computing environment according to the present principles.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 6:
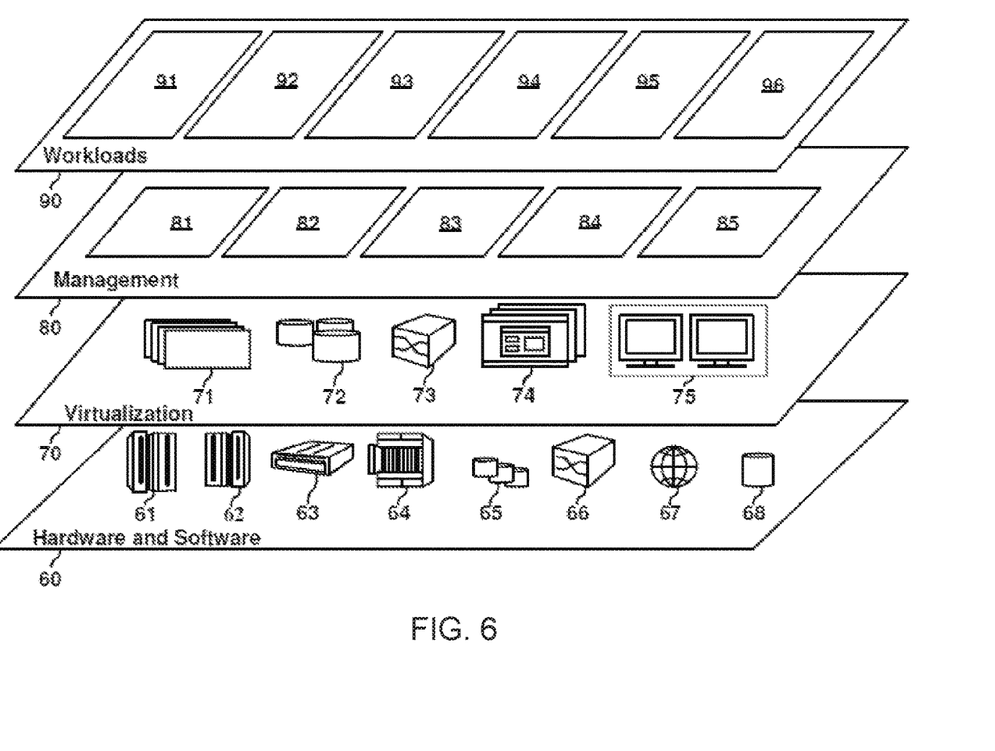
FIG. 6 is a diagram of abstraction model layers according to the present principles.

Referring now to FIG. 6, a set of functional abstraction layers provided by cloud computing environment 50 (FIG. 5) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and host-level, persistent volume management 96.

Having described preferred embodiments of host-level persistent volume management for container clouds (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims.

Having thus described aspects of the invention, with the details and particularity required by the patent laws, what is claimed and desired protected by Letters Patent is set forth in the appended claims:

1. A computer-implemented method for managing persistent volumes, comprising:
   receiving a request from a container on a processing node to access a distributed filesystem that is located outside the processing node;
   mounting the distributed filesystem to a local mount point; and
   giving access to the local mount point to the container.

2. The computer-implemented method of claim 1, further comprising communicating synchronization information regarding the distributed filesystem to other processing nodes.

3. The computer-implemented method of claim 2, wherein the distributed filesystem is non-exclusively mounted, such that other containers can also access the distributed filesystem.

4. The computer-implemented method of claim 1, further comprising enforcing quota limits on the local mount point.

5. The computer-implemented method of claim 1, wherein the local mount point is a directory in a local filesystem of the processing node.

6. The computer-implemented method of claim 1, wherein receiving the request from the container invokes a hostpath driver in a container orchestration engine.

7. The computer-implemented method of claim 6, wherein the hostpath driver communicates with a storage provision engine that performs the mounting and that communicates directory information back to the hostpath driver to give access to the local mount point.

8. The computer-implemented method of claim 6, wherein the distributed filesystem is mounted as a persistent volume without invoking any native persistent volume driver within the container orchestration engine.

9. The computer-implemented method of claim 1, wherein the distributed filesystem is also mounted to a container on at least one other processing node.

10. A non-transitory computer readable storage medium comprising a computer readable program for managing persistent volumes, wherein the computer readable program when executed on a computer causes the computer to perform the steps of:
    receiving a request from a container on a processing node to access a distributed filesystem that is located outside the processing node;
    mounting the distributed filesystem to a local mount point; and
    giving access to the local mount point to the container.

11. A system for managing persistent volumes, comprising:
    a container orchestration engine, executed in a hardware processing node, configured to receive a request from a container on a processing node to access a distributed filesystem that is located outside the processing node; and
    a storage provision engine configured to mount the distributed filesystem to a local mount point and to give access to the local mount point to the container.

12. The system of claim 11, further comprising a sync engine configured to communicate synchronization information regarding the distributed filesystem to other processing nodes.

13. The system of claim 12, wherein the distributed filesystem is non-exclusively mounted, such that other containers can also access the distributed filesystem.

14. The system of claim 11, further comprising a quota manager configured to enforce quota limits on the local mount point.

15. The system of claim 11, wherein the local mount point is a directory in a local filesystem of the processing node.

16. The system of claim 11, wherein the request from the container invokes a hostpath driver in the container orchestration engine.

17. The system of claim 16, wherein the hostpath driver communicates with the storage provision engine and wherein the storage provision engine is further configured to communicate directory information back to the hostpath driver to give access to the local mount point.

18. The system of claim 16, wherein the distributed filesystem is mounted as a persistent volume without invoking any native persistent volume driver within the container orchestration engine.

19. The system of claim 11, wherein the distributed filesystem is also mounted to a container on at least one other processing node.

20. The method of claim 1, wherein the container includes a set of software applications, configuration files, and workload datasets and is instantiated by a container orchestration engine.

* * * * *